United States Patent [19]

Rogstadius

[11] 4,434,809
[45] Mar. 6, 1984

[54] PIPE COUPLING
[76] Inventor: John I. F. Rogstadius, Sidensvansvägen 6, Älvsjö, Sweden
[21] Appl. No.: 285,103
[22] PCT Filed: Dec. 1, 1980
[86] PCT No.: PCT/SE80/00308
  § 371 Date: Jul. 15, 1981
  § 102(e) Date: Jul. 15, 1981
[87] PCT Pub. No.: WO81/01737
  PCT Pub. Date: Jun. 25, 1981

[30] Foreign Application Priority Data
  Dec. 6, 1979 [SE] Sweden ............................ 7910060
[51] Int. Cl.³ ............................................ F16K 43/00
[52] U.S. Cl. ................................. 137/318; 72/71; 83/54; 222/80; 408/54
[58] Field of Search ............... 72/70, 71, 325; 83/54; 137/318, 320, 321, 323; 138/94; 408/85, 86, 87, 54, 100, 104

[56] References Cited
U.S. PATENT DOCUMENTS

| 2,565,692 | 8/1951 | Koerbacher et al. | 72/71 |
| 2,736,335 | 2/1956 | Webber | 137/318 |
| 3,162,211 | 12/1964 | Barusch | 72/325 |
| 3,394,727 | 7/1968 | Wagner | 137/318 |
| 3,554,217 | 1/1971 | Ehrens et al. | 137/318 |
| 3,844,149 | 10/1974 | Hansen | 72/71 |
| 3,983,897 | 10/1976 | Gebelius | 137/67 |
| 4,034,777 | 7/1977 | Gebelius | 137/318 |

FOREIGN PATENT DOCUMENTS

| 2437321 | 12/1976 | Fed. Rep. of Germany | 72/325 |
| 1000907 | 2/1952 | France | 137/318 |
| 1070691 | 8/1954 | France | 137/318 |
| 2129250 | 10/1972 | France | |
| 415391 | 9/1980 | Sweden | |
| 1516143 | 6/1978 | United Kingdom | |
| 470338 | 5/1975 | U.S.S.R. | 72/325 |

Primary Examiner—George L. Walton
Attorney, Agent, or Firm—Dann, Dorfman, Herrell and Skillman

[57] ABSTRACT

A pipe coupling, which renders it possible to connect branch pipes (24) to a feed-pipe (1) without requiring the flow in the feed-pipe to be shut off. In a cylindrical guide passageway (5) of one of two coupling parts (2a,2b) embracing the feed-pipe a piston (4) is located, which is provided with a passageway (10) for fluid connection between the feed-pipe and the branch pipe. The piston is provided with an internal knife (9) which upon rotation of the piston cuts up material out of the feed pipe to form the opening to the passageway and projects the cut-up material into the guide passageway (5) to assist in anchoring the coupling in place.

7 Claims, 7 Drawing Figures

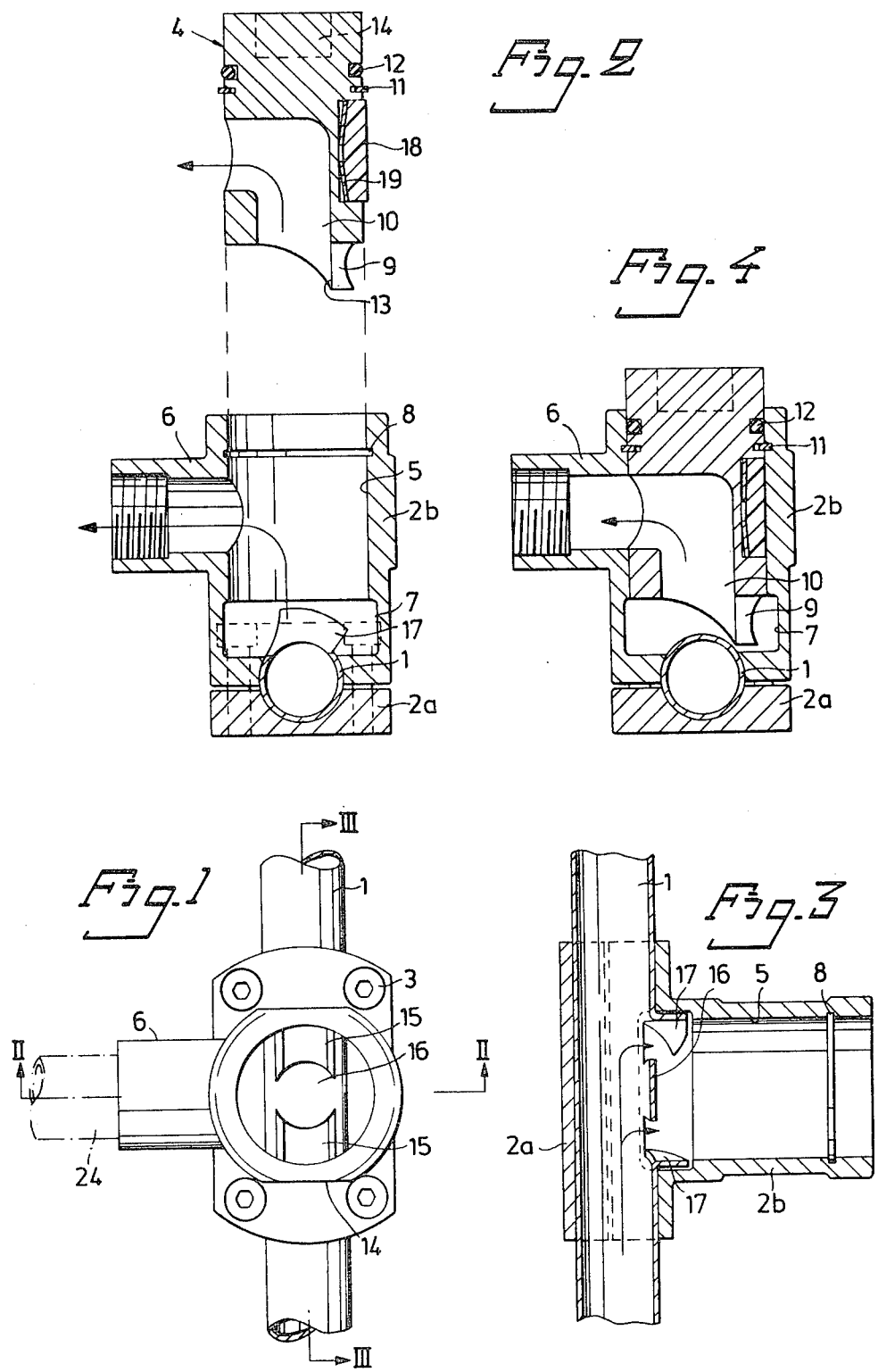

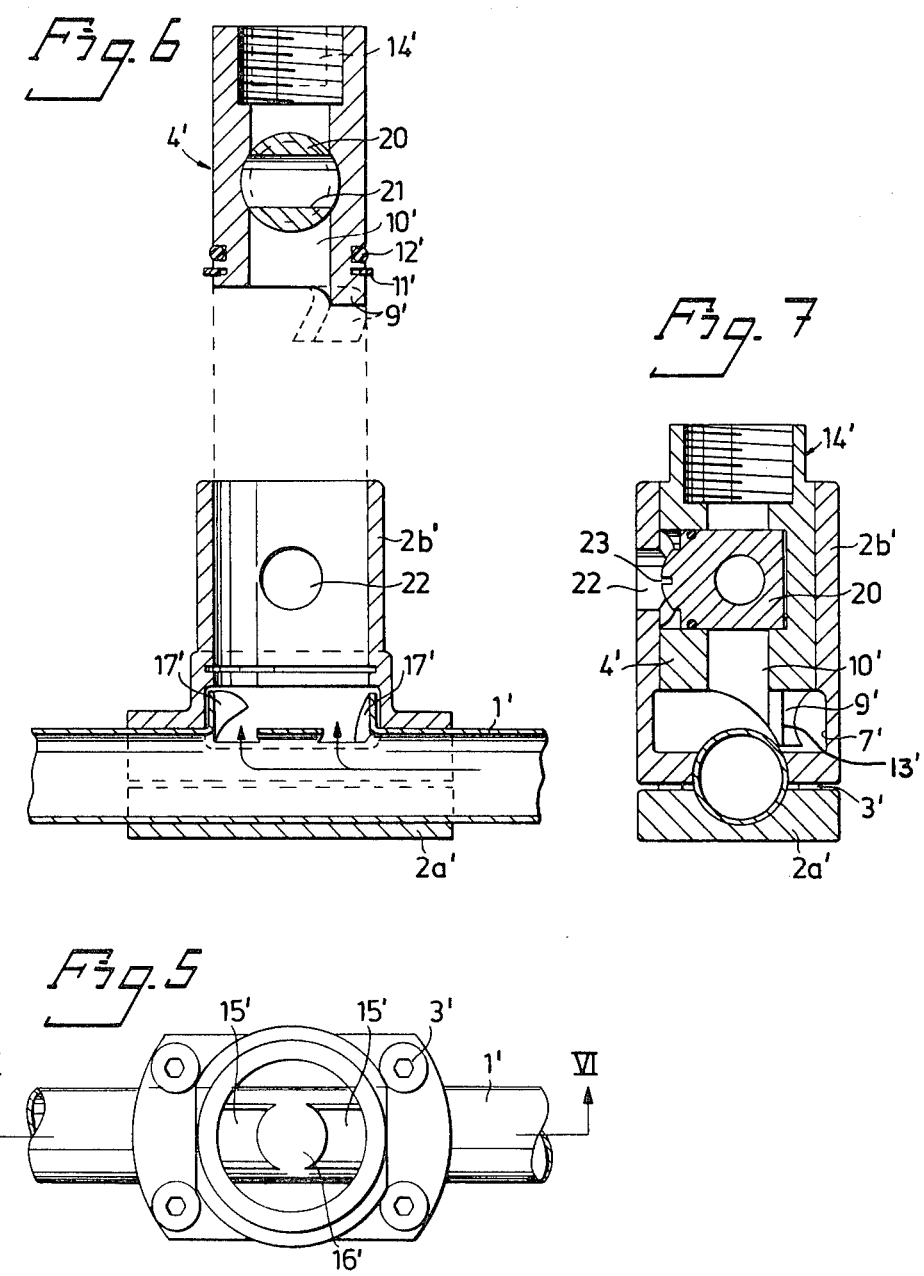

PIPE COUPLING

BACKGROUND OF THE INVENTION

This invention relates to a pipe coupling for connecting branch pipes to a feed-pipe without requiring flow interruption in the feed-pipe.

PRIOR ART

Pipe couplings of this type are known in a great number of different embodiments, as described, for example, in British Pat. No. 1,034,138, French Patent No. 122 557 and U.S. Pat. No. 3,983,897, where, for connection between the feed-pipe, and the branch pipe a passageway is formed in the pipe coupling. The present invention comprises more precisely, as known previously, coupling parts, which sealingly embrace the feed-pipe, a cylindrical guide passageway extending through one coupling part, a fluid-tight piston in the guide passageway, which piston at its inner end is provided with a knife-shaped cutting-up member and is formed with a passageway for fluid connection between the feed-pipe and the branch pipe which is connected to the coupling part, in such a manner, that in assembled position of the coupling parts a portion of the feed-pipe projects in a radial direction into and intersects the guide passageway.

In the pipe coupling of U.S. Pat. No. 3,983,897, the said projecting portion of the pipe shell is cut off by translation of a valve body in a guide passageway. The said movement is effected, for example, by a detonation cartridge which is detonated by a hammer stroke on a firing pin. This pipe coupling thereby not only has the disadvantage of being complicated, but it also involves a certain risk in connection with the handling of detonation cartridges. The known construction, further, implies certain sealing problems.

SUMMARY OF THE INVENTION

With a pipe coupling according to the present invention it is possible by a simple structural design to provide the feed-pipe in a simple and efficient way with one or more holes for fluid connection to the passageway in the coupling part. The flow area of the holes can be made at least as great as the feed-pipe area. It is further possible that the portion, which was cut-up from the feed-pipe when making of the hole is retained attached to the feed-pipe and is folded up in the guide passageway of the coupling part, so that said cut-up portion contributes to an efficient locking between the pipe coupling and the feed-pipe. The pipe coupling according to the invention has the further essential advantage, that complete sealing between the feed-pipe and the branch pipe is obtained when the piston is in the position in which the connection between said pipes is to be shut off.

The characterizing features of the invention for achieving the aforesaid advantages become apparent from the attached claims.

BRIEF DESCRIPTION OF THE DRAWINGS

The invention is described in greater detail in the following by way of a preferred embodiment and with reference to the accompanying drawings, in which FIG. 1 is a plan view of a preferred embodiment of a pipe coupling according to the invention connected to a feed-pipe where, for better clarity a piston forming one part of the pipe coupling is removed from the cylinder part, FIG. 2 is a section along the line II—II in FIG. 1, and also with the piston separated from the cylinder part, FIG. 3 is a section along the line III—III in FIG. 1, FIG. 4 is a section corresponding to that shown in FIG. 2, but with the piston in place in the pipe coupling, FIG. 5 is a plan view similar to FIG. 1 of a second embodiment of a pipe coupling according to the invention, FIG. 6 is a section along the line VI—VI in FIG. 5, where the piston of the pipe coupling is separated from the cylinder part, and FIG. 7 is a section similar to FIG. 4, where the piston is in place in the pipe coupling.

DETAILED DESCRIPTION OF A PREFERRED EMBODIMENT

As appears from the embodiment shown in FIGS. 1–4, the pipe coupling comprises coupling parts 2a and 2b, which are sealed about a feed-pipe 1 and by means of, for example, screws 3 are interconnected and embrace said feed-pipe. The coupling further comprises a piston 4 inserted in one coupling part. The seal between the coupling part 2b and the feed-pipe 1, and also between contacting surfaces of the coupling parts 2a and 2b preferably can be effected by means of a sealing paste.

The coupling part 2b is formed with a guide passageway or cylinder 5, which in assembled position of the coupling parts is directed perpendicularly to the feed-pipe 1. In said position a portion of the feed-pipe projects into the guide passageway. The coupling part 2b further is provided with a connection 6 for a branch pipe (indicated by dashed lines 24 in FIG. 1), which connection projects out of the coupling part 2b perpendicularly relative to the guide passageway. The passageway 5 has at its inner end closest to the feed-pipe 1 a widened portion 7, and at its outer end portion beyond the connection 6 it is formed with a recess 8.

The outer diameter of the piston 4, which in FIG. 2 is shown separated from the coupling part 2b, and in FIG. 4 is shown in place in the coupling part 2b in an operative position for the pipe coupling, is adapted to the cylindrical shape of the guide passageway 5. The inner end of the piston is formed with a knife 9, and the piston further is provided with a through passageway 10. The piston in its fully inserted position, is locked against axial translation relative to the coupling part 2b by means of a locking ring 11 provided in the recess 8 in the guide passageway 5 and is sealed beyond the ring 11 by means of a sealing ring 12 abutting the wall of the guide passageway. In said position the passageway 10 is located on the same level as the connection 6, and the knife 9 is located to the side of the feed-pipe portion projecting into the guide passageway. The knife has a cutting edge 13, which extends in a first direction longitudinally of the piston from the tip of the knife alongside the feed-pipe at least to the same level as the shell surface of the feed-pipe which is located fartherest inwardly in the guide passageway.

With a pipe coupling according to the embodiment described above, transversely directed pipes easily can be connected without interrupting the operation of the main pipe in transporting liquids or gases. When in the aforesaid assembled position of the pipe coupling, the piston 4 is turned clockwise through one revolution, for example by a key in the socket 14, the knife 9 cuts a first hole into the feed pipe 1 in its pass from one side to the other and cuts a second hole in its pass from the other side back to the one side. The knife 9 and its cutting edge 13 may have different shapes for cutting holes of different shapes. An the embodiment shown, the knife has "plough-shape", and the cutting edge extends in a second direction transverse to the wall of the passageway 10. By this knife shape two spaced holes 15 with an intermediate bridge 16 are obtained. Besides, the material cut-up from the feed-pipe is not detached, but is folded upward into the widened portion 7 in the guide passageway 5 and is retained in said portion as indicated by reference numeral 17, so that the cut-away part is not carried away by the flow. Due to the fact, that the cut-up material does not project into the flow and does not disturb the flow, by being folded downward into the same, an effective fixing anchoring of the pipe coupling in its position on the feed-pipe is obtained by the folded-up material 17.

The piston 4, subsequent to the cutting operation, serves as a valve body for controlling the flow rate through the pipe connection 6. In conventional pipe couplings with valve bodies it has been a problem to achieve fully satisfactory sealing when the flow between feed-pipe and branch pipe was shut off. In the embodiment according to FIGS. 1–4, as shown, the problem has been solved by simple means. The piston 4 is provided with a sealing plug 18, which by a spring washer 19 located inside of the sealing plug is maintained pressed outward, whereby after the turning of the piston 4 for closing the opening between the connection 6 and passageway 10 the spring-loaded sealing plug registers with the opening of the connection 6 and ensures flow shut-off.

In FIGS. 5–7 an embodiment is shown where the connection for the branch pipe extends in the same direction as the flow passageway of the piston, which passageway in its turn extends throughout the length of the piston in the same direction as the cylindrical guide passageway of the coupling part. As appears from the drawings, details corresponding to those of the embodiment shown in FIGS. 1–4 have been given the same reference numerals followed by a prime.

In this embodiment a valve body 20 with a through passageway 21 is inserted in the piston 4'. The valve body is rotatably adjustable between a position, in which the flow connection between the feed-pipe 1' and the branch pipe 6' through the passageway 21 is fully open, and a position, in which the connection between said pipes is fully closed. Said rotation can be effected, for example, through a hole 22 in the coupling part 26' for a screw driver to co-operate with a slot 23 in the valve body 20.

The invention, of course, is not restricted to the embodiments described above and shown in the drawings, but can be varied in several ways within the scope of the attached claims. The pipe coupling, for example, can be designed for the connection of more than one branch pipe, and the knife may be formed to cut, for example, a complete hole in the feed pipe. The essential feature of the invention is the simple and efficient making of holes in the feed-pipe by simply rotating the knife-carrying piston whereby also large flow holes relative to the dimension of the feed-pipe can be obtained. It also renders possible an efficient locking of the pipe coupling to the feed-pipe by folding-up the material cut-up at the hole making. A further essential property of the invention is the efficient sealing by the spring-loaded gasket or plug when the flow between the feed-pipe and branch pipe is being shut off.

I claim:

1. A pipe coupling for connecting a branch pipe to a feed-pipe, comprising coupling parts sealingly embracing the feed-pipe, a cylindrical guide passageway in one of the coupling parts having an axis radial to said feed-pipe, a piston sealingly inserted in the guide passageway for rotation about said axis and provided at its inner end with a knife-shaped cutting-up member and formed with a passageway for flow connection between the feed-pipe and the branch pipe connected to the coupling part, so that in assembled position of the coupling parts a portion of the feed-pipe radially intersects the guide passageway, characterized in that the knife-shaped member of the piston is offset to one side of the axis and is located within said passageway alongside said intersecting portion of the feed-pipe, and the cutting edge of the knife-shaped member extends in one direction longitudinally of said piston from a point alongside said pipe to at least to the same level as the shell surface of said feed-pipe portion located fartherest inwardly in the guide passageway, so that upon rotation of the piston without any axial translation, said knife-shaped member passes from one side of the feed-pipe to the other and cuts up at least a first hole in the feed pipe.

2. A pipe coupling as defined in claim 1 wherein said passageway mounts said piston for full rotation and has means preventing axial translation of said piston during said rotation, whereby upon further rotation of said piston, the knife member passes from said other side back to said one side and cuts at least a second hole in the feed-pipe and leaves an intermediate bridge between said first and second holes.

3. A pipe coupling as defined in claim 1 or claim 2, characterized in that said cutting edge extends in a second direction transversely forming a plough shape so that the material from the hole cut in the feed-pipe is folded up in the guide passageway.

4. A pipe coupling as defined in claim 3, characterized in that said passageway has a recess beyond said cutting edge so that the folded material is displaced within said recess.

5. A pipe coupling as defined in claim 1 or claim 2, characterized in that the flow passageway has an opening for connection to said branch pipe, the piston flow passageway in one position registers with said opening and in a second position is out of registry, so that said piston acts as a valve means, said one position of the piston being such that the knife member is on one side of the feed-pipe.

6. A pipe coupling as defined in claim 5, characterized in that the piston is provided with a sealing plug which is resilient and upon rotation of the piston to said second position registers with the opening of the flow passageway to seal the same, said second position being such that the knife member is on the other side of the feed-pipe.

7. A pipe coupling as defined in claim 1 or claim 2, characterized in that the piston has a valve body with a through passageway, said valve body being rotatable between a first position, in which the flow passageway of the piston is closed, and a second position, in which the flow connection between the feed-pipe and the branch pipe is established through the passageway of the valve body.

* * * * *